(12) United States Patent
Yagi

(10) Patent No.: US 8,978,500 B2
(45) Date of Patent: Mar. 17, 2015

(54) HYDRAULIC PRESSURE SUPPLY APPARATUS FOR TRANSMISSION

(75) Inventor: Noriyuki Yagi, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 333 days.

(21) Appl. No.: 13/476,482

(22) Filed: May 21, 2012

(65) Prior Publication Data

US 2012/0304815 A1   Dec. 6, 2012

(30) Foreign Application Priority Data

May 31, 2011   (JP) ................................ 2011-121641

(51) Int. Cl.
*F16H 61/12*   (2010.01)
*F16H 61/14*   (2006.01)
*F16H 61/02*   (2006.01)
*F16H 61/688*  (2006.01)

(52) U.S. Cl.
CPC .......... *F16H 61/143* (2013.01); *F16H 61/0206* (2013.01); *F16H 61/688* (2013.01)
USPC ............ 74/333; 74/335; 74/473.11; 192/3.28

(58) Field of Classification Search
CPC ................................. F16H 45/02; F16H 3/006
USPC ............ 74/330, 335, 473.11, 333; 192/3.28, 192/3.29; 477/130
See application file for complete search history.

(56) References Cited

U.S. PATENT DOCUMENTS

| | | | | |
|---|---|---|---|---|
| 4,768,635 A | * | 9/1988 | Sakurai et al. ................ | 477/169 |
| 4,795,015 A | * | 1/1989 | Hibino et al. ................... | 477/65 |
| 5,799,260 A | * | 8/1998 | Droste et al. .................... | 701/51 |
| 6,024,663 A | * | 2/2000 | Suzuki et al. ................. | 475/123 |
| 7,621,845 B2 | | 11/2009 | Soga | |
| 8,206,265 B2 | | 6/2012 | Maten et al. | |
| 2010/0186530 A1 | * | 7/2010 | Tamai et al. ............... | 74/473.11 |

FOREIGN PATENT DOCUMENTS

| | | |
|---|---|---|
| CN | 101255917 A | 9/2008 |
| CN | 101900202 A | 12/2010 |
| JP | 2009-92213 A | 4/2009 |

OTHER PUBLICATIONS

Office Action dated May 29, 2014, issued in corresponding Chinese Patent Application No. 201210171948.4, with English Translation (11 pages).

* cited by examiner

*Primary Examiner* — William C Joyce
(74) *Attorney, Agent, or Firm* — Westerman, Hattori, Daniels & Adrian, LLP

(57) ABSTRACT

In an hydraulic pressure supply apparatus for a transmission having an input shaft connected to a drive shaft of a prime mover mounted on a vehicle through a torque converter with a lockup clutch, it is configured to have a hydraulic pump drawing up and discharging operating oil; a regulator valve regulating discharged pressure to a line pressure; first and second switching valves supplying hydraulic pressure to the first and second clutches; a first hydraulic control valve supplying the regulated line pressure to the lockup clutch; a third switching valve connected to an output port of the first hydraulic control valve; and first and second electromagnetic valves connected to operating ports of the first, second and third switching valves and adapted to switch among the first, second and third switching valves upon being energized and deenergized.

4 Claims, 6 Drawing Sheets

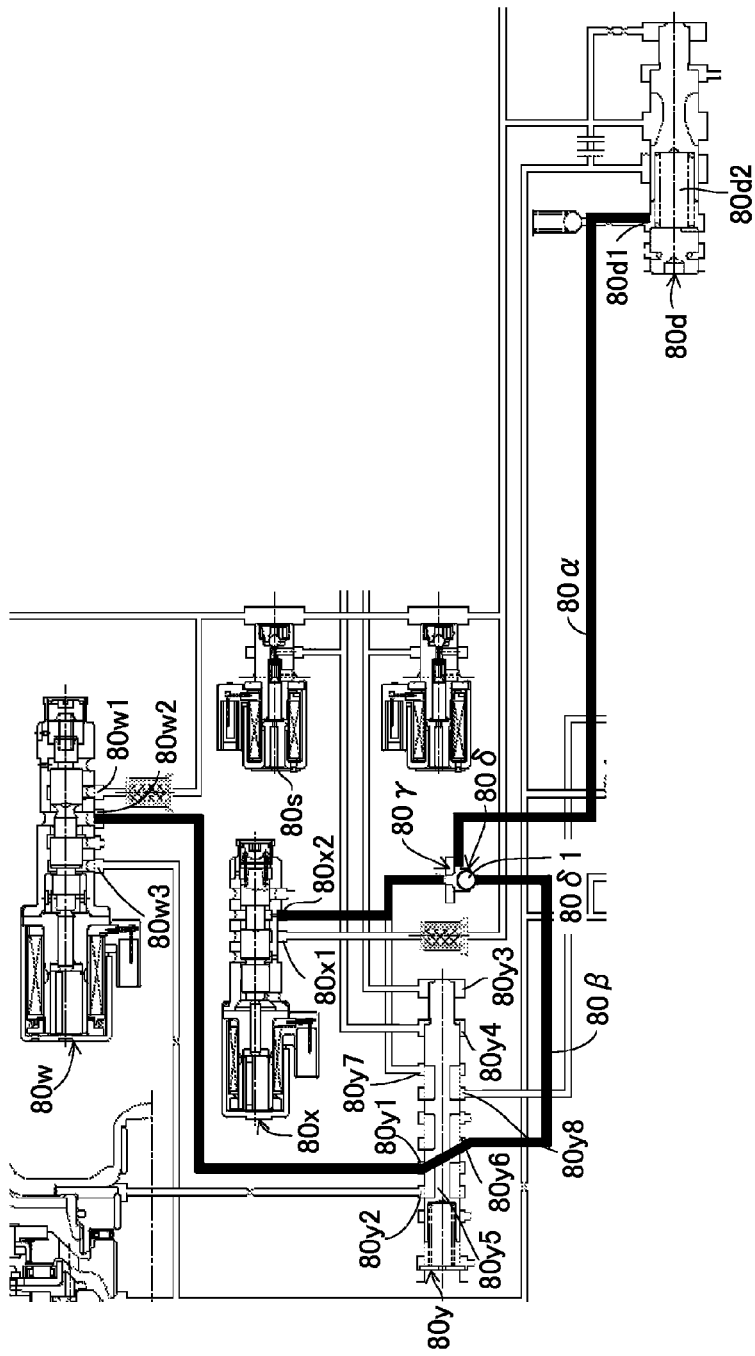

FIG.4

| MODE | | SH-SOL | | | | | CLUTCH | | | SERVO | | | | | | | | LC | PL |
|---|---|---|---|---|---|---|---|---|---|---|---|---|---|---|---|---|---|---|---|
| | | A | B | C | D | E | CL1 | CL2 | RVS | PS1 | PS3 | PS5 | PS7 | PS2 | PS4 | PS6 | PS8 | | |
| A | 1 | × | × | × | × | × | A | B | × | × | × | × | × | × | D | C | × | E | F |
| | 2 | × | × | × | × | ○ | A | B | × | × | × | × | × | × | D | × | C | E | F |
| | 3 | × | × | × | ○ | × | A | B | × | × | × | × | × | × | D | × | C | E | F |
| | 4 | × | × | × | ○ | ○ | A | B | × | × | × | × | × | × | D | × | C | E | F |
| | 5 | × | × | ○ | × | × | A | B | × | × | C | D | × | × | × | × | × | E | F |
| | 6 | × | × | ○ | × | ○ | A | B | × | × | C | × | D | × | × | × | × | E | F |
| | 7 | × | × | ○ | ○ | × | A | B | × | C | × | D | × | × | × | × | × | E | F |
| | 8 | × | × | ○ | ○ | ○ | A | B | × | C | × | × | D | × | × | × | × | E | F |
| B | 1 | × | ○ | × | × | × | A | × | × | × | × | × | × | × | × | C | × | × | ForE |
| | 2 | × | ○ | × | × | ○ | A | × | B | × | × | × | × | × | × | C | × | × | ForE |
| | 3 | × | ○ | × | ○ | × | A | × | × | × | × | × | × | × | × | D | C | × | ForE |
| | 4 | × | ○ | × | ○ | ○ | A | × | B | × | × | × | × | × | × | D | C | × | ForE |
| | 5 | × | ○ | ○ | × | × | A | × | × | × | × | C | × | × | × | × | × | × | ForE |
| | 6 | × | ○ | ○ | × | ○ | A | × | × | × | × | C | × | × | × | × | × | × | ForE |
| | 7 | × | ○ | ○ | ○ | × | A | × | × | C | × | × | × | × | × | D | × | × | ForE |
| | 8 | × | ○ | ○ | ○ | ○ | A | × | × | C | × | × | × | × | × | D | × | × | ForE |
| C | 1 | ○ | × | × | × | × | × | B | × | × | × | × | × | × | D | × | × | × | ForE |
| | 2 | ○ | × | × | × | ○ | × | B | × | × | × | C | × | D | × | × | × | × | ForE |
| | 3 | ○ | × | × | ○ | × | × | B | × | × | × | × | × | × | D | × | × | × | ForE |
| | 4 | ○ | × | × | ○ | ○ | × | B | × | × | × | C | × | D | × | × | × | × | ForE |
| | 5 | ○ | × | ○ | × | × | × | B | × | × | × | D | × | × | × | × | × | × | ForE |
| | 6 | ○ | × | ○ | × | ○ | × | B | PL | × | × | C | D | × | × | × | × | × | ForE |
| | 7 | ○ | × | ○ | ○ | × | × | B | × | × | × | D | × | × | × | × | × | × | ForE |
| | 8 | ○ | × | ○ | ○ | ○ | × | B | PL | × | × | C | D | × | × | × | × | × | ForE |
| D | 1 | ○ | ○ | × | × | × | × | × | × | × | × | × | × | × | × | × | × | × | ForE |
| | 2 | ○ | ○ | × | × | ○ | × | × | B | × | × | C | × | × | × | × | × | × | ForE |
| | 3 | ○ | ○ | × | ○ | × | × | × | × | × | × | × | × | × | × | D | × | × | ForE |
| | 4 | ○ | ○ | × | ○ | ○ | × | × | B | × | × | C | × | × | × | D | × | × | ForE |
| | 5 | ○ | ○ | ○ | × | × | × | × | × | × | × | × | × | × | × | × | × | × | ForE |
| | 6 | ○ | ○ | ○ | × | ○ | × | × | PL | × | × | C | × | × | × | × | × | × | ForE |
| | 7 | ○ | ○ | ○ | ○ | × | × | × | × | × | × | × | × | × | × | D | × | × | ForE |
| | 8 | ○ | ○ | ○ | ○ | ○ | × | × | PL | × | × | C | × | × | × | D | × | × | ForE |

HYDRAULIC PRESSURE SUPPLY APPARATUS FOR TRANSMISSION

BACKGROUND

1. Technical Field

An embodiment of the invention relates to a hydraulic pressure supply apparatus for a transmission, particularly to a hydraulic pressure supply apparatus for a vehicle transmission that can disengage (release) a lockup clutch of a torque converter with the simple structure.

2. Background Art

When a transmission has a torque converter equipped with a lockup clutch, under a predetermined vehicle driving condition, unless the lockup clutch is promptly disengaged, a prime mover such as an engine stalls. To cope with it, a conventional technique is configured to install a special device for releasing the lockup clutch, as taught, for example, by Japanese Laid-Open Patent Application No. 2009-92213 ('213).

SUMMARY

The technique of the reference is configured as above to promptly disengage the lockup clutch under the predetermined vehicle driving condition, yet it requires the special device, the cost rises disadvantageously.

Further, in the reference, the manual valve is installed for switching a hydraulic passage in response to the operation of a range selector manipulated by the operator. However, the manual valve needs to be set with at least four positions of D, P, R and N and it leads to the increase in its valve length, while, since it is connected with a lever installed in a vehicle interior, it degrades the layout of components in a transmission case. Thus, due to the installment of the manual valve, the transmission can not have the compact structure.

An object of an embodiment of the invention is therefore to overcome the foregoing drawbacks by providing a hydraulic pressure supply apparatus for a transmission that can disengage a lockup clutch of a torque converter promptly and easily, while enabling the transmission to operate in a range selected by the operator without the manual valve.

In order to achieve the object, this invention provides an hydraulic pressure supply apparatus for a transmission having an input shaft connected to a drive shaft of a prime mover mounted on a vehicle through a torque converter with a lockup clutch, first and second secondary input shafts installed in parallel with the input shaft, an output shaft connected to a wheel, first and second clutches connect the input shaft to the first and second secondary input shafts upon being supplied with hydraulic pressure, a plurality of pairs of gear groups installed at the first or second secondary input shaft, and a gear selecting mechanism adapted to select one of the plurality of the pairs of the gear groups upon being supplied with hydraulic pressure to establish an odd-numbered speed or even-numbered speed, the transmission changing an output of the prime mover in speed through the established speed and transmitting it to the wheel through the output shaft, comprising: a hydraulic pump adapted to be driven by the prime mover and to draw up operating oil from a hydraulic pressure source and discharge the operating oil; a regulator valve adapted to regulate discharged pressure discharged from the hydraulic pump to a line pressure; first and second switching valves adapted to supply hydraulic pressure to the first and second clutches; a first hydraulic control valve adapted to supply the regulated line pressure to the lockup clutch; a third switching valve connected to an output port of the first hydraulic control valve; and first and second electromagnetic valves connected to operating ports of the first, second and third switching valves and adapted to switch among the first, second and third switching valves upon being energized and deenergized.

BRIEF DESCRIPTION OF THE DRAWINGS

The above and other objects and advantages of an embodiment of the invention will be more apparent from the following description and drawings in which:

FIG. 3 is an enlarged view partially showing the hydraulic pressure circuit diagram of FIG. 2;

FIG. 4 is a table showing operation modes of the transmission shown in FIG. 1;

FIG. 5 is a set of explanatory views showing the characteristics of outputs relative to supply current of a hydraulic control valve shown in FIG. 2 and the like; and FIG. 6 is a set of explanatory views similarly showing the characteristics of outputs relative to supply current of the hydraulic control valve shown in FIG. 2 and the like.

DESCRIPTION OF EMBODIMENT

A hydraulic pressure supply apparatus for a transmission according to an embodiment of the present invention will now be explained with reference to the attached drawings.

Figure 1:
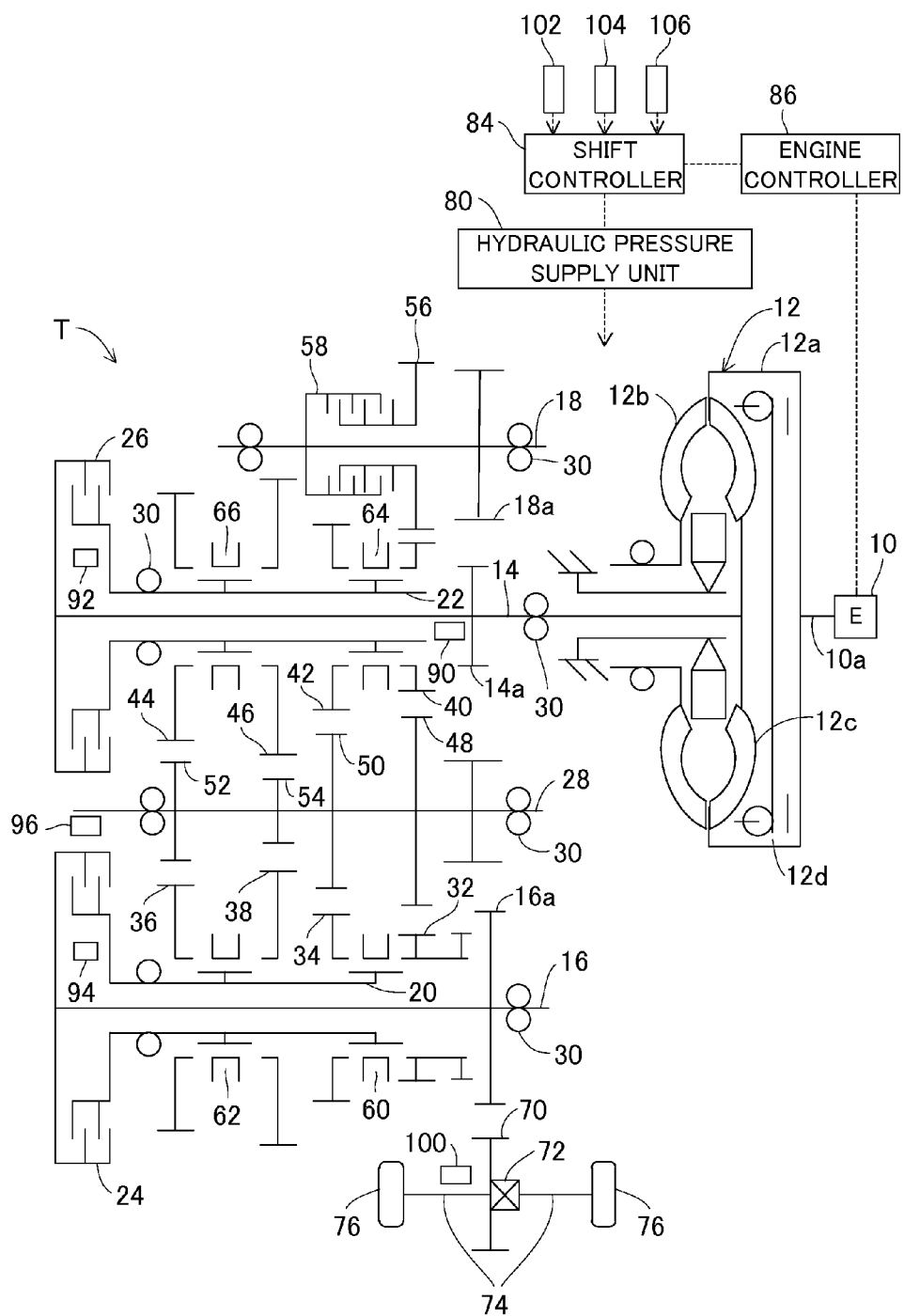
FIG. 1 is an overall schematic view of a hydraulic pressure supply apparatus for a transmission according to an embodiment of this invention.
Figure 2:
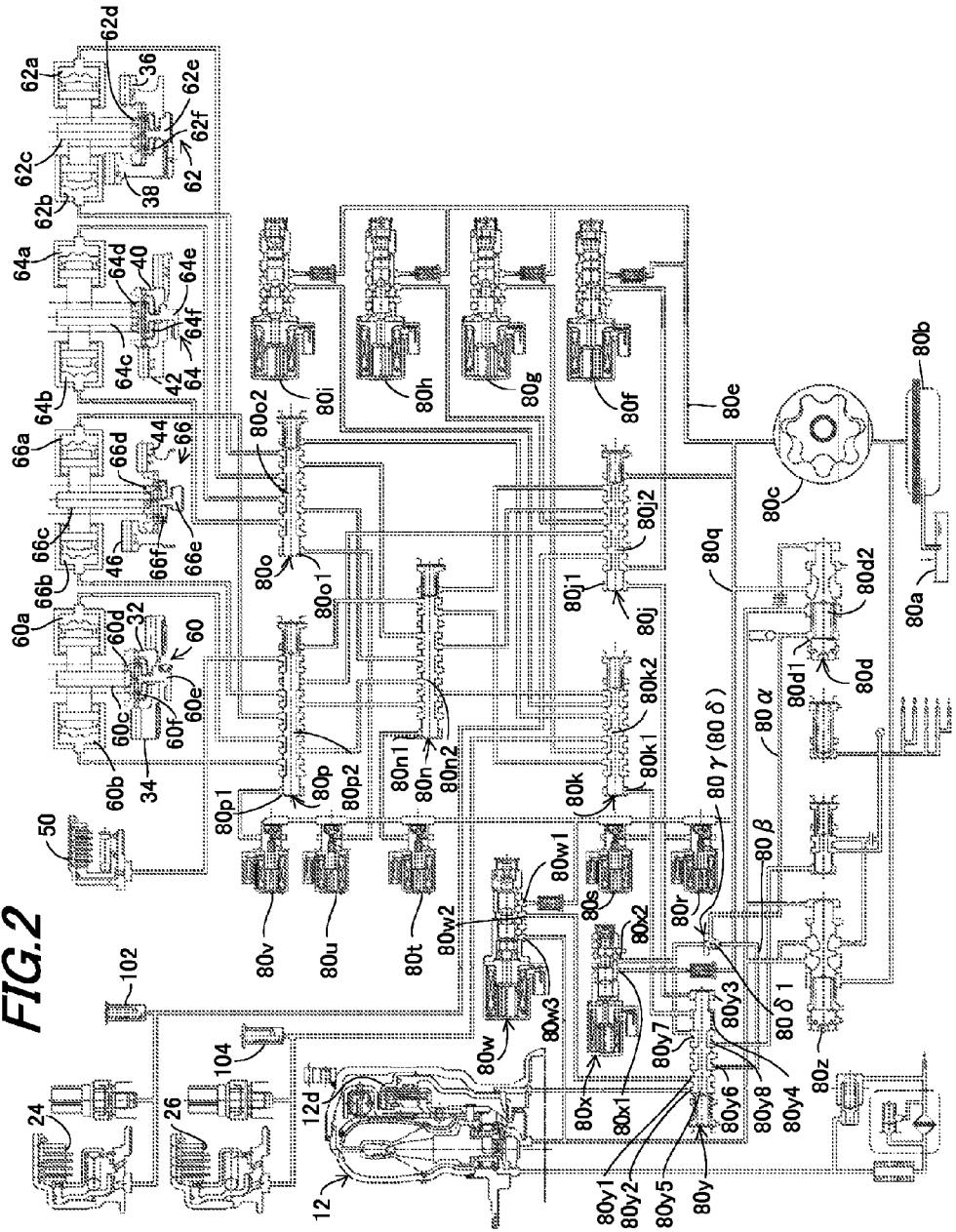
FIG. 2 is a hydraulic pressure circuit diagram showing details of a hydraulic pressure supply unit shown in FIG. 1.

FIG. 1 is an overall schematic view of a hydraulic pressure supply apparatus for a transmission according to an embodiment of this invention, FIG. 2 is a hydraulic pressure circuit diagram showing details of the apparatus shown in FIG. 1, FIG. 3 is an enlarged view partially showing the hydraulic pressure circuit diagram of FIG. 2 and FIG. 4 is a table showing operation modes of the transmission shown in FIG. 1.

In FIG. 1, symbol T indicates the transmission. The transmission T comprises a dual (twin) clutch type automatic transmission mounted on a vehicle (not shown) and having gear positions (gear ratios) of 8 forward speeds and 1 reverse speed. The transmission T has ranges of D, P, R and N.

The transmission T is installed with an even-numbered speed input shaft (hereinafter called "even input shaft") 14 connected via a torque converter 12 to a drive shaft 10a connected to a crankshaft of an engine (prime mover) 10, and an odd-numbered speed input shaft (hereinafter called "odd input shaft") 16 in parallel with the even input shaft 14. The engine 10 comprises, for example, a spark-ignition, gasoline internal combustion engine.

The torque converter 12 has a pump impeller 12b fixed to a drive plate 12a that is directly connected to the drive shaft 10a of the engine 10, a turbine runner 12c fixed to the even input shaft 14, and a lockup clutch 12d, so that the driving force (rotation) of the engine 10 is transmitted to the even input shaft 14 through the torque converter 12.

An idle shaft 18 is installed in parallel with the even and odd input shafts 14, 16. The even input shaft 14 is connected to the idle shaft 18 via gears 14a, 18a and the odd input shaft 16 to the idle shaft 18 via gears 16a, 18a, whereby the even and odd input shafts 14, 16 and idle shaft 18 are rotated by the rotation of the engine 10.

Further, a first secondary input shaft 20 and second secondary input shaft 22 are installed on outer peripheries of the odd and even input shafts 16, 14 to be coaxially therewith and rotated relative thereto, respectively.

The odd input shaft 16 and the first secondary input shaft 20 are interconnected by a first clutch 24, while the even input shaft 14 and the second secondary input shaft 22 by a second clutch 26. The first and second clutches 24, 26 comprise hydraulically-operated multi-plate wet clutches.

An output shaft 28 is disposed between the even and odd input shafts 14, 16 in parallel therewith. The even and odd input shafts 14, 16, idle shaft 18 and output shaft 28 are rotatably supported by bearings 30.

The first secondary input shaft 20 on the odd-numbered speed side is fixed with a first-speed drive gear 32, third-speed drive gear 34, fifth-speed drive gear 36 and seventh-speed drive gear 38, while the second secondary input shaft 22 on the even-numbered speed side with a second-speed drive gear 40, fourth-speed drive gear 42, sixth-speed drive gear 44 and eighth-speed drive gear 46.

The output shaft 28 is fixed with a first-second speed driven gear 48 to be meshed with the first-speed and second-speed drive gears 32, 40, a third-fourth speed driven gear 50 to be meshed with the third-speed and fourth-speed drive gears 34, 42, fifth-sixth speed driven gear 52 to be meshed with the fifth-speed and sixth-speed drive gears 36, 44, and a seventh-eighth speed driven gear 54 to be meshed with the seventh-speed and eighth-speed drive gears 38, 46.

The idle shaft 18 rotatably supports an RVS (reverse) idle gear 56 that is to be meshed with the first-second speed driven gear 48 fixed at the output shaft 48. The idle shaft 18 is connected with the RVS idle gear 56 through an RVS clutch 58.

The RVS clutch 58 comprises a hydraulically-operated multi-plate wet clutch similarly to the first and second clutches 24, 26, but the diameter and the number of friction plates of the RVS clutch 58 are smaller than those of the clutches 24, 26. In the operation mode table in FIG. 4, the first and second clutches 24, 26 are indicated by "CL1" and "CL2" and the RVS clutch 50 by "RVS" in the "CLUTCH" column.

The odd input shaft 16 is disposed with a first-third speed synch (synchronizing) mechanism 60 that selectively engages the first-speed drive gear 32 or third-speed drive gear 34 with the first secondary input shaft 20 and with a fifth-seventh speed synch (synchronizing) mechanism 62 that selectively engages the fifth-speed drive gear 36 or seventh-speed drive gear 38 with the first secondary input shaft 20.

The even input shaft 14 is disposed with a second-fourth speed synch (synchronizing) mechanism 64 that selectively engages the second-speed drive gear 40 or fourth-speed drive gear 42 with the second secondary input shaft 22 and with a sixth-eighth speed synch (synchronizing) mechanism 66 that selectively engages the sixth-speed drive gear 44 or eighth-speed drive gear 46 with the second secondary input shaft 22. The synch mechanisms 60, 62, 64, 66 engage the gears with the shafts while synchronizing the rotation therebetween.

When the first clutch 24 or the second clutch 26 is engaged, the driving force of the engine 10 is transmitted via the odd input shaft 16 to the first secondary input shaft 16 or via the even input shaft 14 to the second secondary input shaft 22, and then transmitted to the output shaft 28 through relevant ones of the aforementioned drive gears and driven gears.

When the vehicle is to be moved backward, the driving force of the engine 10 is transmitted to the output shaft 28 through the even input shaft 14, gear 14a, gear 18a, RVS clutch 58, idle shaft 18, RVS idle gear 56 and first-second speed driven gear 48.

The output shaft 28 is connected to a differential mechanism 72 through a gear 70 and the differential mechanism 72 is connected to wheels 76 through drive shafts 74.

The synch mechanisms 60, 62, 64, 66 are operated upon being supplied with hydraulic pressure. A hydraulic pressure supply unit 80 is provided to supply hydraulic pressure to the above synch mechanisms 60, 62, 64, 66, first and second clutches 24, 26 and RVS clutch 58.

The hydraulic pressure supply unit 80 will be explained with reference to FIG. 2.

In the hydraulic pressure supply unit 80, discharged pressure (hydraulic pressure) of operating oil ATF that is pumped up (drawn) from a reservoir 80a through a strainer 80b by a hydraulic pump (oil transfer pump) 80c, is regulated (decreased) to a line pressure by a regulator valve 80d.

Although not illustrated, the hydraulic pump 80c is connected to the pump impeller 12b of the torque converter 12 through a gear so that the hydraulic pump 80c is driven by the engine 10.

The regulated line pressure is sent to input ports of first, second, third and fourth linear solenoid valves (hydraulic control valves (electromagnetic control valves)) 80f, 80g, 80h, 80i through a hydraulic passage 80e. In a CLUTCH column and SERVO column of the operation mode table in FIG. 4, the first to fourth linear solenoid valves 80f, 80g, 80h, 80i are indicated by A, B, C and D, respectively.

Each of the first to fourth linear solenoid valves 80f, 80g, 80h, 80i is configured to have the characteristics in which a spool is displaced in proportion to supplied current so as to change output hydraulic pressure to be outputted from its output port linear, and is of N/C (normally-closed) type in which the spool is displaced to the open position upon being supplied with current (being energized).

The output port of the first linear solenoid valve 80f is connected to the first clutch 24 of the odd input shaft 16 through a first clutch shift valve 80j, while the output port of the second linear solenoid valve 80g is connected to a piston chamber of the second clutch 26 of the even input shaft 14 through a second clutch shift valve 80k.

When the first or second clutch 24, 26 is engaged (made ON) upon being supplied with hydraulic pressure, the first or second secondary input shaft 20 or 22 is fastened to the odd or even input shaft 16 or 14. In contrast, when hydraulic pressure is discharged so that the first or second clutch 24, 26 is disengaged (made OFF), the connection between the first or second secondary input shaft 20 or 22 and the odd or even input shaft 16 or 14 is cut off.

The output port of the third linear solenoid valve 80h is connected to a fifth-speed piston chamber 62a and seventh-speed piston chamber 62b of the fifth-seventh speed synch mechanism 62 and also to a second-speed piston chamber 64a and fourth-speed piston chamber 64b of the second-fourth speed synch mechanism 64 through the first clutch shift valve 80j and first and second servo shift valves 80n, 80o.

The output port of the fourth linear solenoid valve 80i is connected to a first-speed piston chamber 60a and third-speed piston chamber 60b of the first-third speed synch mechanism 60 and also to a sixth-speed piston chamber 66a and eighth-speed piston chamber 66b of the sixth-eighth speed synch mechanism 66 through the second clutch shift valve 80k, the first servo shift valve 80n and a third servo shift valve 80p.

In the synch mechanisms, the above piston chambers 60a and 60b, 62a and 62b, 64a and 64b and 66a and 66b are arranged to face each other, and pistons of each pair are interconnected by a shared piston rod. The piston rod of each pair is connected to a shift folk 60c, 62c, 64c, 66c.

The shift folk 60c, 62c, 64c, 66c is fixed on a folk shaft (not shown). Detents (not shown) are provided at the folk shaft at positions corresponding to the neutral position and right and left gear-in (engaging) positions. When the shift folk 60c, 62c, 64c, 66c is at the neutral or gear-in position, the position is retained by the detent, thereby making hydraulic pressure supply unnecessary.

In the synch mechanism 60, 62, 64, 66, as shown in FIG. 2, the shift folk 60c, 62c, 64c, 66c is connected to a circular sleeve 60d, 62d, 64d, 66d. The inner periphery of the sleeve 60d, 62d, 64d, 66d accommodates a hub 60e, 62e, 64e, 66e that is spline-coupled to the first or second secondary input shaft 20, 22 to be movable in the axial direction.

The first-speed and third-speed drive gears 32, 34 are installed on either side of the hub 60e through a blocking ring 60f, the fifth-speed and seventh-speed drive gears 36, 38 on either side of the hub 62e through a blocking ring 62f, the second-speed and fourth-speed drive gears 40, 42 on either side of the hub 64e through a blocking ring 64f, and the sixth-speed and eighth-speed drive gears 44, 46 on either side of the hub 66e through a blocking ring 66f. Springs are each provided near the blocking rings 60f, 62f, 64f, 66f.

The blocking rings 60f, 62f, 64f, 66f are formed with splines while the associated drive gears are formed with dog teeth. Further, the blocking rings 60f, 62f, 64f, 66f are formed with tapered cones while the associated drive gears are formed with corresponding tapered cones.

Further explanation will be made taking the synch mechanism 60 as an example. Since it is configured as described above, when hydraulic pressure is supplied to one of the piston chambers, e.g., the third-speed piston chamber 60b so that the first-speed piston chamber 60a facing thereto and the piston rod connected to the piston chamber 60a are moved forward right in FIG. 2, the sleeve 60d connected to the piston rod through the shift folk 60c is moved in the same direction and contacts the spring to urge the blocking ring 60f toward the first-speed drive gear 32 through the spring.

When the sleeve 60d is moved further forward, the spline of the sleeve 60d contacts the spline of the blocking ring 60f and the tapered cone of the blocking ring 60d contacts the tapered cone of the gear 32, whereby torque is induced by the frictional force.

When the sleeve 60d is still further moved, the rotation of the sleeve 60d and that of gear 32 are synchronized due to the torque and the sleeve 60d is moved forward with its spline pushing the spline of the blocking ring 60f. Subsequently, when the torque disappears due to the synchronized rotation, the sleeve 60d is moved still further forward so that its spline is integrally engaged with the spline of the blocking ring 60f, and moved still further forward to be integrally engaged with the dog teeth of the gear 32. Thus the gear-in (engaging) condition is established.

The other synch mechanisms 62, 64, 66 are configured in the same manner. Specifically, when the sleeve 62d, 64d, 66d is axially moved (shifted) from the center (corresponding to the neutral position) to the in-gear position, it is engaged with the dog teeth of corresponding one of the drive gears 36, 38, 40, 42, 44, 46 as synchronizing their rotation, so as to connect the drive gear 36, etc., to the first or second secondary input shaft 20, 22.

The line pressure of a hydraulic passage 80q regulated by controlling an amount of operating oil discharged from a pressure regulation port 80d1 of the regulator valve 80d, is sent to input ports of first to fifth solenoid valves (hydraulic control valves (electromagnetic valves)) 80r, 80s, 80t, 80u, 80v.

Those solenoid valves 80r, 80s, 80t, 80u, 80v are N/C type ON/OFF solenoid valves in each of which a spool is displaced to the open position upon being supplied with current (being energized). In an SH-SOL column of the operation mode table in FIG. 4, the first to fifth solenoid valves 80r, 80s, 80t, 80u, 80v are indicated by A, B, C, D and E, respectively.

An output port of the first solenoid valve 80r is connected to an operating port 80j1 of the first clutch shift valve 80j to urge a spool 80j2 rightward (in the drawing) against urging force of a spring. An output port of the second solenoid valve 80s is connected to an operating port 80k1 of the second clutch shift valve 80k to urge a spool 80k2 rightward against urging force of a spring.

An output port of the third solenoid valve 80t is connected to an operating port 80n1 of the first servo shift valve 80n to urge a spool 80n2 rightward against urging force of a spring.

Similarly, an output port of the fourth solenoid valve 80u is connected to an operating port 80o1 of the second servo shift valve 80o to urge a spool 80o2 rightward, while an output port of the fifth solenoid valve 80v is connected to an operating port 80p1 of the third servo shift valve 80p to urge a spool 80p2 rightward.

The hydraulic pressure supply unit 80 is further provided with a fifth linear solenoid valve (second hydraulic control valve (electromagnetic control valve)) 80w, sixth linear solenoid valve (first hydraulic control valve (electromagnetic control valve)) 80x and LC shift valve (switching valve) 80y.

The fifth linear solenoid valve 80w is of N/C type in which a spool is displaced to the open position upon being supplied with current (being energized), while the sixth linear solenoid valve 80x is of N/O (normally-opened) type in which a spool is displaced to the closed position upon being supplied with current.

In an LC column of the operation mode table in FIG. 4, the fifth linear solenoid valve 80w is indicated by E and in a PL column thereof, the sixth linear solenoid valve 80x by F. In FIG. 4, the "LC" means the pressure supplied to the lockup clutch 12d of the torque converter 12 and the "PL" means the line pressure.

Returning to the explanation on FIG. 2, an input port 80w1 of the fifth linear solenoid valve 80w is connected to the aforementioned line pressure, while a first output port 80w2 thereof is connected to an input port 80y1 of the LC shift valve 80y and then, through the input port 80y1 and an output port 80y2, connected to an input side of the lockup clutch 12d of the torque converter 12.

Internal pressure of the torque converter 12 is connected to a feedback port of the fifth linear solenoid valve 80w. Engagement and disengagement of the lockup clutch 12d is controlled by the LC shift valve 80y and degree of engagement (engagement pressure) thereof is regulated through output pressure of the fifth linear solenoid valve 80w.

The output ports of the first and second solenoid valves 80r, 80s are connected not only to the first and second clutch shift valves 80j, 80k but also to operating ports 80y3, 80y4 of the LC shift valve 80y, respectively, and it makes possible to urge a spool 80y5 leftward (in the drawing) against urging force of a spring.

Accordingly, when the first and second solenoid valves 80r, 80s are deenergized (demagnetized), the spool 80y5 of the LC shift valve 80y is positioned as illustrated so that the input port 80y1 and output port 80y2 are communicated with each other.

As a result, LC control pressure outputted from the fifth linear solenoid valve 80w is supplied to the lockup clutch 12d of the torque converter 12 through the input port 80y1 and output port 80y2, thereby engaging the lockup clutch 12d.

On the other hand, when at least one of the first and second solenoid valves 80r, 80s is energized (magnetized), the spool 80y5 of the LC shift valve 80y is displaced leftward in the drawing and, as shown in FIG. 3, the input port 80y1 is communicated with an output port 80y6. Consequently, the hydraulic pressure supply to the torque converter 12 (i.e., a piston chamber of the lockup clutch 12d) is stopped and, since the output port 80y2 is connected to a drain port, the operating oil in the piston chamber of the lockup clutch 12d is discharged through the drain port.

An input port 80x1 of the sixth linear solenoid valve 80x is connected to the line pressure and an output port 80x2 thereof is, on the one hand, connected to a second input port 80y7 of the LC shift valve 80y and then, through the input port 80y7 and an output port 80y8, connected to a lubricating system (or a connecting section which is described later).

On the other, the output port 80x2 of the sixth linear solenoid valve 80x is connected to the pressure regulation port 80d1 of the regulator valve 80d through a hydraulic passage 80a, as clearly shown in FIG. 3. As a result, the line pressure supplied through the sixth linear solenoid valve 80x supplies hydraulic pressure (signal pressure) to one end of a pool 80d2 of the regulator valve 80d through the pressure regulation port 80d1.

Thus, it is configured such that, in accordance with a position of the spool 80d2 that can be displaced in response to the signal pressure sent after being regulated by the sixth linear solenoid valve 80x, the regulator valve 80d regulates (decreases) discharged pressure of the hydraulic pump 80c to further regulate the line pressure.

The hydraulic passage 80α connecting the output port 80x2 of the sixth linear solenoid valve 80x and the pressure regulation port 80d1 of the regulator valve 80d is connected via the connecting section (now assigned by 80γ) with a hydraulic passage 80β connected to the first output port 80w2 of the fifth linear solenoid valve 80w through the LC shift valve 80y. The connecting section 80γ is installed with a selecting mechanism 80δ.

As shown in FIG. 3, the selecting mechanism 80δ has a ball valve 80δ1 that is movably housed in an oil chamber having a larger diameter than inner diameters of the hydraulic passages 80α, 80β.

The ball valve 80δ1 functions to select the higher-pressure one between the output pressure of the fifth linear solenoid valve 80w and that of the sixth linear solenoid valve 80x such that the selected one acts on the pressure regulation port 80d1 of the regulator valve 80d.

To be more specific, in the selecting mechanism 80δ, the oil chamber is connected with the hydraulic passages 80α, 80β so that they face to each other, while the ball valve 80δ1 is movably housed in the oil chamber. Owing to the configuration, upon being pressed by the higher-pressure output between the output pressures of the fifth and sixth linear solenoid valves 80w, 80x supplied through the hydraulic passages 80α, 80β, the ball valve 80δ1 can be moved to obstruct the lower-pressure output side (that faces the higher-pressure output side). Thus, it is configured to select the higher-pressure output between the output pressures of the fifth and sixth linear solenoid valves 80w, 80x, such that the selected one acts on the pressure regulation port 80d1 of the regulator valve 80d.

Hence, the output ports of the first and second solenoid valves 80r, 80s are connected not only to the first and second clutch shift valves 80j, 80k but also to one end of the spool 80y5 through the operating ports 80y3, 80y4 of the LC shift valve 80y, so that the spool 80y5 is urged leftward (in the drawing) against urging force of a spring.

As mentioned above concerning the explanation about the hydraulic pressure supply to the lockup clutch 12d of the torque converter 12, when the first and second solenoid valves 80r, 80s are both deenergized, the spool 80y5 of the LC shift valve 80y is positioned as illustrated so that the input port 80y1 and output port 80y5 are communicated with each other, whereby the line pressure outputted through the fifth linear solenoid valve 80w is supplied to the lockup clutch 12d of the torque converter 12 through the input port 80y1 and output port 80y2.

On the other hand, when at least one (or both) of the first and second solenoid valves 80r, 80s is energized, the spool 80y5 of the LC shift valve 80y is displaced leftward in FIG. 3 so that the input port 80y1 is communicated with the output port 80y6, whereby, as shown in the drawing, the line pressure transmitted through the fifth linear solenoid valve 80w is sent from the output port 80y6 to the connecting section 80γ through the hydraulic passage 80β.

The explanation on FIG. 1 will be resumed. The transmission T has a shift controller 84. The shift controller 84 is constituted as an Electronic Control Unit (ECU) having a microcomputer. Further, an engine controller 86 similarly constituted as an ECU having a microcomputer is provided to control the operation of the engine 10.

The shift controller 84 is able to communicate with the engine controller 86 to acquire information including an engine speed, throttle opening, AP (Accelerator Pedal) opening, etc., therefrom.

A first rotational speed sensor 90 is installed near the even input shaft 14 to produce an output or signal indicative of an input rotational speed NM of the transmission T, while second, third and fourth rotational speed sensors 92, 94, 96 are installed at the first and second secondary input shafts 20, 22 and the output shaft 28, respectively, and each produces an output or signal indicative of a rotational speed of the associated shaft. A fifth rotational speed 100 is installed near the drive shaft 74 to produce an output or signal indicative of a vehicle speed V.

First and second pressure sensors 102, 104 are installed at hydraulic passages connected to the first and second clutches 24, 26 of the hydraulic pressure supply unit 80 to produce outputs or signals indicative of pressure (hydraulic pressure) of the operating oil ATF to be supplied to the first and second clutches 24, 26, respectively.

A range selector position sensor 106 is provided near a range selector (not shown) installed at the operator's seat of the vehicle and produces an output or signal indicative of a range selected from among D, P, R and N through manipulation by the operator.

The outputs of the above sensors are all sent to the shift controller 84. Based on the sensor outputs and information acquired by communicating with the engine controller 86, the shift controller 84 energizes and deenergizes the first linear solenoid valve 80f, etc., in accordance with the operation mode table in FIG. 4, thereby controlling the operation of the transmission T.

As shown in the operation mode table in FIG. 4, in this embodiment, the transmission T has four operation modes of A, B, C and D, as follows:

A: Normal driving (running) in the D range
B: Driving (running) only with odd-numbered speed in the D range
C: Driving (running) only with even-numbered speed in the D range
D: Driving (running) in the R range or parked in the P or N range In the foregoing, the modes B and C are given as fail safe modes to be applied when a failure (abnormality) occurs at the first or second clutch 24, 26, or the like.

In FIG. 4, numbers of 1 to 8 labeled beside A, B, C and D in a vertical row under the "MODE" (operation mode) indicate forward gears of first to eighth speeds. Letters of A, B, C, D and E in a lateral row under the "SH-SOL" indicate the first to fifth solenoid valves 80r, 80s, 80t, 80u, 80v as mentioned above, and when a circle (o) is given, it means to be energized while when a cross (x) is given, it means to be deenergized, so that the corresponding gear is established.

In the same manner, letters of A, B, C, D, E and F under the "CLUTCH," "SERVO," "LC" and "PL" indicate the first to sixth linear solenoid valves 80f, 80g, 80h, 80i, 80w, 80x. When one of the letters of A to F is given, it means that the corresponding valve is energized.

The fifth and sixth linear solenoid valves 80w, 80x are indicated by E and F in the LC column and PL column. In the PL column, "F or E" means that the higher-pressure one between the output pressure of the fifth linear solenoid valve 80x (F) and that of the sixth linear solenoid valve 80w (E) is applied.

As for the reverse gear, in the mode A, since it is established when hydraulic pressure is supplied to the RVS clutch 58 to engage it, no indication is given. In the modes B, C and D, the reverse gear is not established when a cross (x) is given and is established when one of the valves corresponding to the indicated letter, e.g., the second linear solenoid valve 80g indicated by B is energized.

As can be clearly seen in FIG. 4, this embodiment is characterized in that the lockup clutch 12d of the torque converter 12 can be disengaged with simple structure, while the operation of the transmission T can be changed among the above four operation modes.

The change in the operation mode is first explained. When both of the first and second solenoid valves 80r, 80s are deenergized, the mode A is established. When the first solenoid valve 80r is deenergized and the second solenoid valve 80s is energized, the mode B is established, while in the opposite case thereof, the mode C is established. When both of the first and second solenoid valves 80r, 80s are energized, the mode D is established.

In the mode A, the first and second clutches 24, 26 and the lockup clutch 12d are all engageable; in the mode B, only the first clutch 24 is engageable; in the mode C, only the second clutch 26 is engageable; and in the mode D, none of the three clutches 24, 26, 12d are engageable.

Based on the output of the range selector position sensor 106, when a failure does not occur at the first and second clutches 24, 26, the shift controller 84 energizes and deenergizes the first and second solenoid valves 80r, 80s to establish the mode A or D, while when a failure occurs, controlling the valves 80r, 80s to establish the mode C or D in accordance with the table of FIG. 4.

In the mode A, the first-third speed synch mechanism 60 is moved rightward in FIGS. 1 and 2 to connect the first-speed drive gear 32 to the first secondary input shaft 20 to engage the first clutch 24, so that the first speed gear is established.

When the second-fourth speed synch mechanism 64 is moved rightward in FIGS. 1 and 2 to connect the second-speed drive gear 40 to the second secondary input shaft 22 to engage the second clutch 26, the second speed gear is established. The gear is shifted up and down among the first to eighth speeds by repeating the similar process.

At this time, a so-called "pre-shift" operation in which, while a present gear is established, hydraulic pressure is supplied to the synch mechanism corresponding to the next (target) gear, is carried out. With this, it becomes possible to shift the gear with uninterrupted driving force and good response.

This embodiment is configured to be able to change (select) the operation mode among the four modes through magnetization and demagnetization of the first and second solenoid valves 80r, 80s. Owing to this configuration, it becomes possible to change or select the operation mode with simple structure, i.e., without the manual valve that is generally used in this type of hydraulic pressure supply apparatus to switch a hydraulic passage in response to the operation of a range selector. Further, since driving of the vehicle in either one of the mode B and C is possible even when a failure occurs, the required minimum driving can be ensured.

Next, the configuration that the lockup clutch 12d of the torque converter 12 can be disengaged with simple structure will be explained. In this embodiment, in order to achieve this configuration, the first output port 80w2 of the fifth linear solenoid valve 80w that controls the line pressure and supplies it to the lockup clutch 12d of the torque converter 12 is connected to the LC shift valve 80y, and the operating ports 80y3, 80y4 of the LC shift valve 80y are connected to at least one (more exactly, both) of the first and second solenoid valves 80r, 80s with which the operation mode can be changed.

Specifically, since some components double as other devices, it becomes possible to suppress increase in the number of components. Further, when a failure occurs, the foregoing configuration simply connects the output port 80y2 of the LC shift valve 80y to the drain port, so that hydraulic pressure supply to the lockup clutch 12d of the torque converter 12 can be promptly stopped to disengage the lockup clutch 12d, thereby reliably avoiding a stall of the engine 10.

This embodiment is further characterized in that, as explained with reference to FIG. 3, the hydraulic passage 80α connecting the output port 80x2 of the sixth linear solenoid valve 80x and the pressure regulation port 80d1 of the regulator valve 80d is connected via the connecting section 80γ with the hydraulic passage 80β connected to the first output port 80w2 of the fifth linear solenoid valve 80w through the LC shift valve 80y, and the connecting section 80γ is installed with the selecting mechanism 80δ in which the higher pressure output is selected to act on the pressure regulation port 80d1 of the regulator valve 80d.

This will be further explained with reference to FIG. 5 onward.

FIG. 5 is a set of explanatory views showing the characteristics of outputs relative to supply current to the valves.

As mentioned earlier, as a technique described in '213, in order to supply a predetermined maximum pressure when a solenoid valve used to control line pressure fails, the solenoid valve is configured to be an N/O type linear solenoid valve that is opened when a failure occurs so as to supply the predetermined maximum pressure. Since manufacturing variance exists in this type of solenoid valve that controls line pressure, a value covering the variance (called the "variance coverage value") is always added to a current value to be supplied. Under this condition, when the maximum value of supply line pressure is increased, a gain of the line pressure relative to the current value is increased and fluctuation in hydraulic pressure is also increased, so that the variance coverage value is needed to be increased.

Figure 5A:
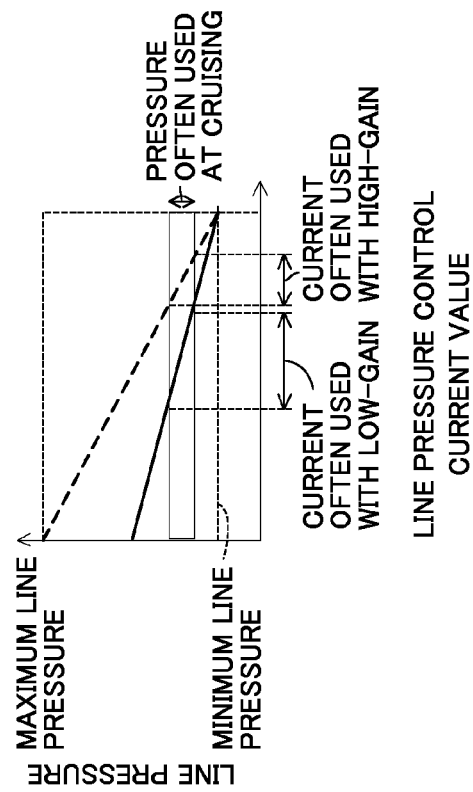

In FIG. 5A, solid lines indicate the characteristics of output pressure (maximum pressure) of the sixth linear solenoid valve 80x and imaginary lines indicate that when it is assumed that the output pressure is increased. As illustrated, when the output pressure is increased, a gain of the output relative to current supplied to a valve is increased and, consequently, fluctuation in hydraulic pressure becomes larger relative to current fluctuation in the same current value (command value), so that control accuracy deteriorates.

Figure 5B:
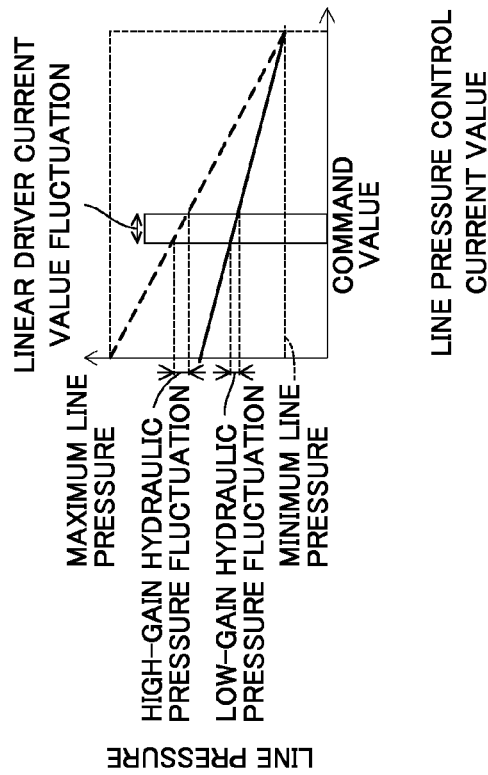

Further, as shown in FIG. 5B, when the output pressure of the sixth linear solenoid valve 80x is increased, consumption current is increased in a low line pressure range that is often used when the vehicle cruises.

In view of the above facts, this embodiment is configured to ensure driving of the vehicle without a special device even when the sixth linear solenoid valve 80x that controls the line pressure fails, and suppress the increase in control margin of the line pressure and in consumption current.

Figure 6B:
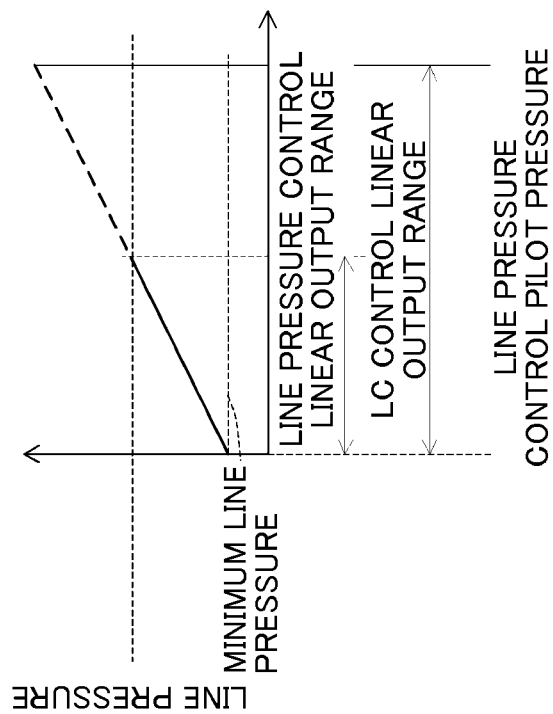
Figure 6A:
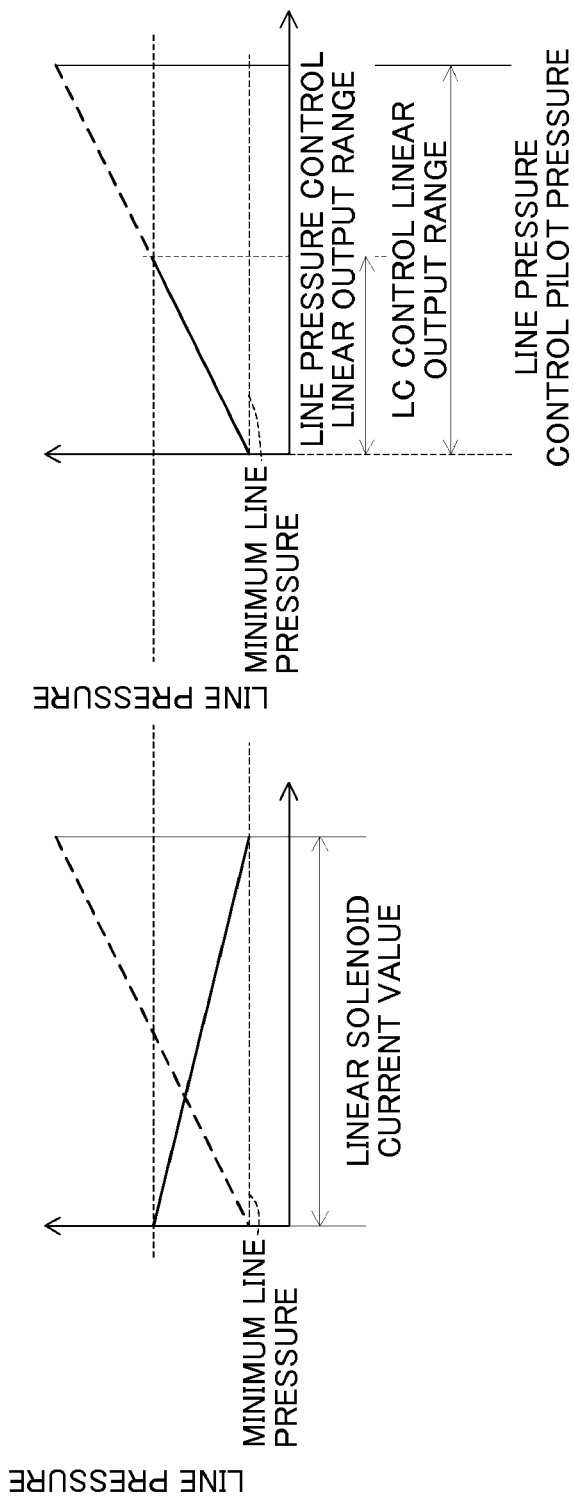

FIG. 6A is an explanatory view showing output pressure characteristics relative to supply current characteristics of the fifth and sixth linear solenoid valve 80w, 80x.

Since the fifth linear solenoid valve 80w needs to output engagement pressure to the lockup clutch 12d of the torque converter 12, the output pressure thereof is set higher than the maximum output pressure of the sixth linear solenoid valve 80x used to control the line pressure.

Note that the sixth linear solenoid valve 80x should preferably be of N/O type because it needs to output necessary hydraulic pressure when failed, while the fifth linear solenoid valve 80w should preferably be of N/C type so as not to output hydraulic pressure when failed.

This embodiment is configured to select the higher-pressure one between the output pressures of the fifth and sixth linear solenoid valves 80w, 80x, as shown in FIG. 6B.

Specifically, in a normal range, since the input port 80y1 and output port 80y2 of the LC shift valve 80y are communicated with each other, the output pressure of the fifth linear solenoid valve 80w is not supplied to the selecting mechanism 80δ. However, in the case where hydraulic pressure is supplied to at least one of the operating ports 80y3, 80y4 of the LC shift valve 80y so that the output port 80y2 and output port 80y6 are communicated with each other, the output pressures of the fifth and sixth linear solenoid valves 80w, 80x are sent to the selecting mechanism 80δ and the higher-pressure one therebetween is outputted from the selecting mechanism 80δ.

Therefore, as mentioned in the foregoing, it is configured such that the selecting mechanism 80δ (ball valve 80δ1) is provided at the connecting section 80γ at which the hydraulic passage 80α connecting the sixth linear solenoid valve 80x and the pressure regulation port 80d1 of the regulator valve 80d and the hydraulic passage 80β connected to the first output port 80w2 of the fifth linear solenoid valve 80w are interconnected.

Further, it is configured such that the fifth linear solenoid valve 80w is connected to the LC shift valve 80y, the operating ports 80y3, 80y4 are connected to the output ports of the first and second solenoid valves 80r, 80s, and the second output port 80y6 of the LC shift valve 80y is connected to the connecting section 80γ, whereby, at the connecting section 80γ, the higher-pressure one between the output pressures of the fifth and sixth linear solenoid valves 80w, 80x is selected to act on the pressure regulation port 80d1.

Here, when hydraulic pressure is not supplied from one or any of the first and second solenoid valves 80r, 80s, the spool 80y5 of the LC shift valve 80y is positioned as illustrated, so that hydraulic pressure supplied from the output port 80y6 of the LC shift valve 80y to the oil chamber of the selecting mechanism 80δ of the connecting section 80γ through the hydraulic passage 80β is zero.

As a result, the ball valve 80δ1 is positioned in the oil chamber of the selecting mechanism 80δ as illustrated and accordingly, the output pressure of the sixth linear solenoid valve 80x is selected and supplied to the regulator valve 80d.

In contrast, when hydraulic pressure is supplied from at least one of the first and second solenoid valves 80r, 80s, the spool 80y5 of the LC shift valve 80y is displaced so that, as shown in FIG. 3, the input port 80y1 is communicated with the output port 80y6 while the output port 80y2 is connected to the drain port. Accordingly, the higher-pressure one between the output pressures of the fifth and sixth linear solenoid valves 80w, 80x is selected and supplied to the regulator valve 80d.

Hence, driving of the vehicle can be ensured without a special device even when the sixth linear solenoid valve 80x that controls the line pressure fails.

Further, when the vehicle is moved backward (reverse), since the lockup clutch 12d is generally disengaged, it is not necessary to use the fifth linear solenoid valve 80w for engaging the lockup clutch 12d. Consequently, when it is desired to make the line pressure high in a limited range such as a reverse range, the fifth linear solenoid valve 80w is utilized for that purpose, so that it becomes possible to reliably establish the reverse gear and suppress the variance coverage value, thereby preventing the increase in consumption current.

To be more specific, since the RVS clutch 58 is smaller in diameter and the number of friction plates than the first and second clutches 24, 26, the higher line pressure is necessary compared to the first and second clutches 24, 26. However, since it is configured as above, the reverse gear can be reliably established.

As stated above, the embodiment is configured to have an hydraulic pressure supply apparatus (hydraulic pressure supply unit 80) for a transmission (T) having an input shaft (12) connected to a drive shaft (10a) of a prime mover (engine 10) mounted on a vehicle through a torque converter (12) with a lockup clutch (12a), first and second secondary input shafts (20, 22) installed in parallel with the input shaft, an output shaft (28) connected to a wheel (76), first and second clutches (24, 26) connect the input shaft to the first and second secondary input shafts upon being supplied with hydraulic pressure, a plurality of pairs of gear groups (drive gears 32, 34, 36, 38, 40, 42, 44, 46) installed at the first or second secondary input shaft, and a gear selecting mechanism (synchronizing mechanisms 60, 62, 64, 66) adapted to select one of the plurality of the pairs of the gear groups upon being supplied with hydraulic pressure to establish an odd-numbered speed or even-numbered speed, the transmission changing an output of the prime mover in speed through the established speed and transmitting it to the wheel through the output shaft, comprising: a hydraulic pump (80c) adapted to be driven by the prime mover and to draw up operating oil (ATF) from a hydraulic pressure source (reservoir 80a) and discharge the operating oil; a regulator valve (80d) adapted to regulate discharged pressure discharged from the hydraulic pump to a line pressure; first and second switching valves (first and second clutch shift valves 80j, 80k) adapted to supply hydraulic pressure to the first and second clutches; a first hydraulic control valve (fifth linear solenoid valve 80w) adapted to supply the regulated line pressure to the lockup clutch; a third switching valve (LC shift valve 80y) connected to an output port of the first hydraulic control valve; and first and second electromagnetic valves (first and second solenoid valves 80r, 80s) connected to operating ports of the first, second and third switching valves and adapted to switch among the first, second and third switching valves upon being energized and deenergized.

With this, it becomes possible to promptly and easily disengage the lockup clutch 12d of the torque converter 12 with simple structure, i.e., without a special device, in other words, with the structure that does not result in high cost. Further, it becomes possible to operate the transmission T in a range selected by the operator without the manual valve.

In the apparatus, one of the first and second electromagnetic valves is energized and deenergized to change an operation mode of the transmission among a first operation mode (mode A) in which shifting is possible with the odd-numbered speed and the even-numbered speed in a forward range (D), a second operation mode (mode B or C) in which shifting is possible with the odd-numbered speed or the even-numbered speed in the forward range, and a third operation mode (mode D) in which the vehicle is driven in a range (NP, R, N) other than the forward range.

With this, in addition to the above effects, the operation of the transmission T can be changed among the three (more precisely, four) modes only by magnetizing and demagnetizing the first and second electromagnetic valves (first and second solenoid valves) 80r, 80s.

In the apparatus, one of the first and second electromagnetic valves is energized and deenergized to supply hydraulic pressure to the lockup clutch through the first hydraulic control valve and stop the supply. With this, in addition to the above effects, the lockup clutch 12d can be easily and promptly disengaged only by magnetizing and demagnetizing the first and second electromagnetic valves (first and second solenoid valves) 80r, 80s.

In the apparatus, the input shaft includes first and second input shafts (odd-numbered speed input shaft 16 and first secondary input shaft 20; even-numbered speed input shaft 14 and second secondary input shaft 22) connected to the drive shaft of the prime mover through first and second clutches, respectively, and the output shaft includes at least one output shaft installed in parallel with the first and second input shafts, and the transmission includes a dual clutch type automatic transmission having: a plurality of speeds (first-speed drive gear 32 to seventh-eighth speed driven gear 54) to be established through gears installed between the first and second input shafts and the output shaft, the plurality of the speeds being constituted by at least four sets; a synchronizing mechanism (60, 62, 64, 66) corresponding to each of the four sets, adapted to be operated upon being supplied with hydraulic pressure to move from a neutral position to select one of the speeds that constitutes a corresponding one of the four sets so as to engage a corresponding one of the gears to one of the first and second input shafts and the output shaft; and a hydraulic pressure supply control unit including first and second pressure regulators (fourth and third linear solenoid valves 80i, 80h) interposed at a hydraulic pressure circuit connecting the hydraulic pressure source and the synchronizing mechanism, each adapted to selectively supply hydraulic pressure to the synchronizing mechanism to move such that the output of the prime mover is outputted from one of the first and second input shafts to the output shaft through the selected speed.

With this, in addition to the above effects, in the dual clutch type automatic transmission, it becomes possible to promptly and easily disengage the lockup clutch 12d of the torque converter 12 with simple structure, i.e., without a special device. Further, it becomes possible to operate the transmission T in a range selected by the operator without the manual valve.

It should be noted that, in the foregoing, although the dual clutch type automatic transmission is explained, it is not limited to the exemplification above and any configuration can be applied.

It should also be noted that, although the engine (internal combustion engine) is exemplified as the prime mover, it may be hybrid combining the engine and an electric motor, or only the motor may be used.

Japanese Patent Application No. 2011-121641 filed on May 31, 2011 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An hydraulic pressure supply apparatus for a dual clutch type automatic transmission having an input shaft connected to a drive shaft of a prime mover mounted on a vehicle through a torque converter with a lockup clutch, first and second secondary input shafts installed in parallel with the input shaft, an output shaft connected to a wheel, first and second clutches for connecting the input shaft to the first and second secondary input shafts upon being supplied with hydraulic pressure, a plurality of odd-numbered pairs of gear groups installed at the first secondary input shaft, a plurality of even-numbered pairs of gear groups installed at the second secondary input shaft, and a gear selecting mechanism adapted to select one of the plurality of the odd-numbered pairs of the gear groups and the plurality of the even-numbered pairs of the gear groups upon being supplied with hydraulic pressure to establish an odd-numbered speed or even-numbered speed, the transmission changing an output of the prime mover in speed through the established speed and transmitting it to the wheel through the output shaft, comprising:

a hydraulic pump adapted to be driven by the prime mover and to draw up operating oil from a hydraulic pressure source and discharge the operating oil;

a regulator valve adapted to regulate discharged pressure discharged from the hydraulic pump to a line pressure;

first and second switching valves adapted to supply hydraulic pressure to the first and second clutches respectively;

a first hydraulic control valve adapted to supply the regulated line pressure to the lockup clutch through a third switching valve connected to an output port of the first hydraulic control valve;

a first electromagnetic valve connected to operating ports of the first and third switching valves; and a second electromagnetic valve connected to operating ports of the second and third switching valves, wherein the first and second electromagnetic valves are adapted to switch among the first, second and third switching valves upon being energized and deenergized.

2. The apparatus according to claim 1, wherein one of the first and second electromagnetic valves is energized and deenergized to change an operation mode of the transmission among a first operation mode in which shifting is possible with the odd-numbered speed and the even-numbered speed in a forward range, a second operation mode in which shifting is possible with the odd-numbered speed or the even-numbered speed in the forward range, and a third operation mode in which the vehicle is driven in a range other than the forward range.

3. The apparatus according to claim 1, wherein one of the first and second electromagnetic valves is energized and deenergized to supply hydraulic pressure to the lockup clutch through the first hydraulic control valve and stop the supply.

4. The apparatus according to claim 1, wherein the input shaft includes first and second input shafts connected to the drive shaft of the prime mover through the first and second clutches, respectively, and the output shaft includes at least one output shaft installed in parallel with the first and second input shafts, and the transmission includes a dual clutch type automatic transmission having:
- a plurality of speeds to be established through gears installed between the first and second input shafts and the output shaft, the plurality of the speeds being constituted by at least four sets;
- a synchronizing mechanism corresponding to each of the four sets, adapted to be operated upon being supplied with hydraulic pressure to move from a neutral position to select one of the speeds that constitutes a corresponding one of the four sets so as to engage a corresponding one of the gears to one of the first and second input shafts and the output shaft; and
- a hydraulic pressure supply control unit including first and second pressure regulators interposed at a hydraulic pressure circuit connecting the hydraulic pressure source and the synchronizing mechanism, each adapted to selectively supply hydraulic pressure to the synchronizing mechanism to move such that the output of the prime mover is outputted from one of the first and second input shafts to the output shaft through the selected speed.

* * * * *